(12) United States Patent
Nishino

(10) Patent No.: US 6,917,408 B2
(45) Date of Patent: Jul. 12, 2005

(54) DISPLAY PANEL

(75) Inventor: Hiromi Nishino, Matsuzaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 31 days.

(21) Appl. No.: 10/307,343

(22) Filed: Dec. 2, 2002

(65) Prior Publication Data

US 2003/0103184 A1 Jun. 5, 2003

(30) Foreign Application Priority Data

Nov. 30, 2001 (JP) ..................................... P2001-367304
Sep. 25, 2002 (JP) ..................................... P2002-279945

(51) Int. Cl.[7] ...................... G02F 1/1368; G02F 1/1345
(52) U.S. Cl. ...................................... 349/149; 349/151
(58) Field of Search ........................... 349/43, 139, 143, 349/147, 148, 149, 150, 151, 152; 257/59, 72, 750, 752, 761, 763

(56) References Cited

U.S. PATENT DOCUMENTS 4,543,573 A * 9/1985 Fuyama et al. ............. 349/147
5,187,604 A * 2/1993 Taniguchi et al. .......... 349/152

FOREIGN PATENT DOCUMENTS

JP    6-37314    * 2/1994
JP    2000-19554   1/2000

* cited by examiner

*Primary Examiner*—Tarifur R. Chowdhury
*Assistant Examiner*—Tai Duong
(74) *Attorney, Agent, or Firm*—Nixon & Vanderhye P.C.

(57) ABSTRACT

A thin tantalum film deposited on an insulating substrate is patterned to form an electrode wiring of a first layer which is the lowermost layer for constituting the input lead wiring and, then, an SiNx film is formed as the gate-insulating film. An electrode wiring of a second layer formed of an ITO (indium tin oxide) film and an electrode wiring of a third layer formed of a thin tantalum film are laminated on the gate-insulating film in a manner that the plurality of electrode wiring portions possess widths W1, W2 and W3 which are 300 μm or less at the greatest. Here, the electrode wiring of the second layer and the electrode wiring of the third layer are so arranged as will not be overlapped on the edge portions on both sides of the electrode wiring of the first layer.

19 Claims, 10 Drawing Sheets

DISPLAY PANEL

BACKGROUND OF THE INVENTION

1. Field of the Invention

The invention relates to a display panel such as a liquid crystal display panel, an electroluminescence (abbreviated as EL) display panel or a plasma display panel.

2. Description of the Related Art

The display panel such as the liquid crystal display panel, EL display panel or plasma display panel forms a display pattern on a screen by selecting display pixels that are arranged like a matrix on an insulating substrate. Here, the system for selecting the display pixels can be represented by, for example, an active matrix drive system.

The active matrix drive system is the one in which the individual pixel elements are arranged as independent electrodes, the switching elements are connected to the individual pixel electrodes, and the pixel electrodes are selected by the switching elements to drive the display. The active matrix drive system is capable of producing a display maintaining excellent contrast and response, and can be used for the liquid crystal display panel or the like panel that features a reduced thickness and a small electric power consumption.

Concerning the display panels such as the liquid crystal display panel and the like, further, their has been developed and widely put into practical use the chip-on-glass (abbreviated as COG) mounting system in which a driver IC (integrated circuit) is directly mounted on a substrate of a glass or the like in order to drive the switching elements such as thin-film transistors (abbreviated as TFTs) arranged on the glass substrate.

The conventional display panel is constituted by a liquid crystal display device including a gate electrode wiring, a source electrode wiring, an input lead wiring and external connection terminals, and by a gate-driving IC, a source-driving IC and a flexible printed circuit (abbreviated as FPC) board.

The liquid crystal display device is constituted by an insulating substrate and an opposing substrate arranged at a position facing the insulating substrate. A liquid crystal layer is sealed between the insulating substrate and the opposing substrate, and a display region is formed on the insulating substrate.

Drive wiring regions are formed surrounding the display region on the insulating substrate. On the drive wiring regions are formed by COG method a gate driver and a source driver which are the driver ICs for driving liquid crystals. Gate electrode wirings and source electrode wiring drawn from the display region are connected in a plural number to the output sides of the gate driver and the source driver.

A plurality of input lead wirings and external connection terminals continuous to the input lead wirings are formed in predetermined patterns on the input sides of the gate driver and the source driver, and are electrically connected to the gate driver and to the source driver. Further, an FPC board is connected to the external connection terminals.

The power source voltage and signals sent from the FPC board are input to the gate driver and to the source driver through the input lead wirings. Signals from the gate driver and the source driver are sent to the display region through the gate electrode wiring and the source electrode wiring which are output wirings thereby to drive the TFT elements which are switching elements provided in the liquid crystal display device to display a desired image.

When it is attempted to increase the area and to improve the resolution of the above flat panel display (FPD), parasitic capacitance increases between the elements and the wiring and between the elements and the grounding electrodes to adversely affect the elements and circuit characteristics. Or, the resistance of the electrode wiring so increases that the drive signals are delayed to a large extent.

In order to operate the TFT elements on the display panel such as liquid crystal display panel, therefore, accent and delay of the signals are suppressed for the gate electrode wiring, source electrode wiring and input lead wiring connecting the pixel electrode to the drive power source in order to prevent erroneous operation caused by a drop in the voltage.

Due to limitation such as reduction in the outer size, further, the drive wiring region tends to become narrow, and it is becoming more important to decrease the resistance of the input lead wiring.

As for a conventional display panel, Japanese Unexamined Patent Publication JP-A 2000-19554 (2000) discloses "A COG-Type Liquid Crystal Display Element". The structure of the input lead wiring and the procedure of production disclosed in JP-A 2000-19554 will now be described with reference to FIGS. 8 and 9.

Figure 8:
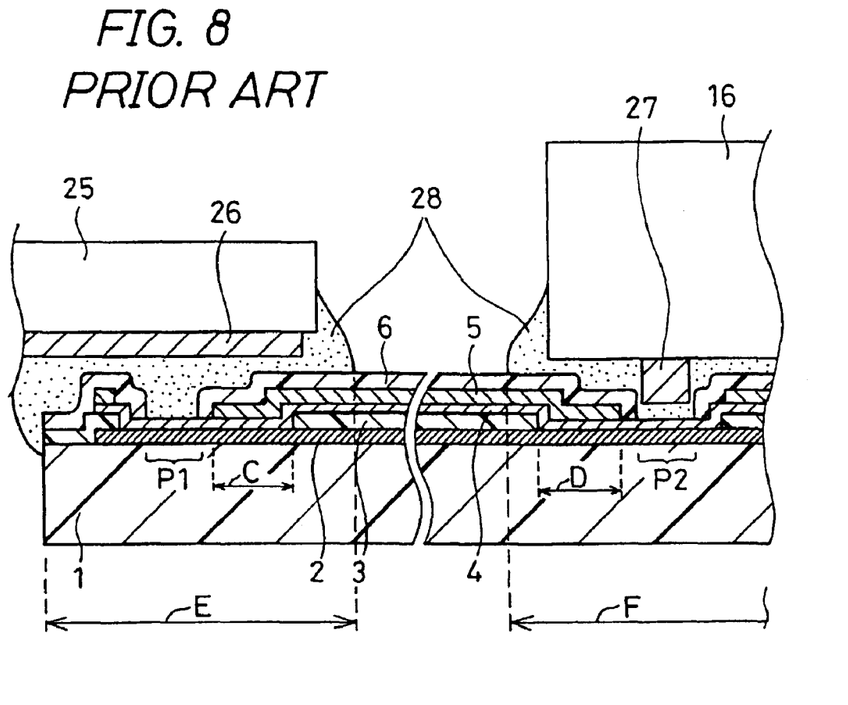
FIG. 8 is a sectional view in the direction of a current illustrating the structure of an input lead wiring in a conventional display panel.
Figure 9:
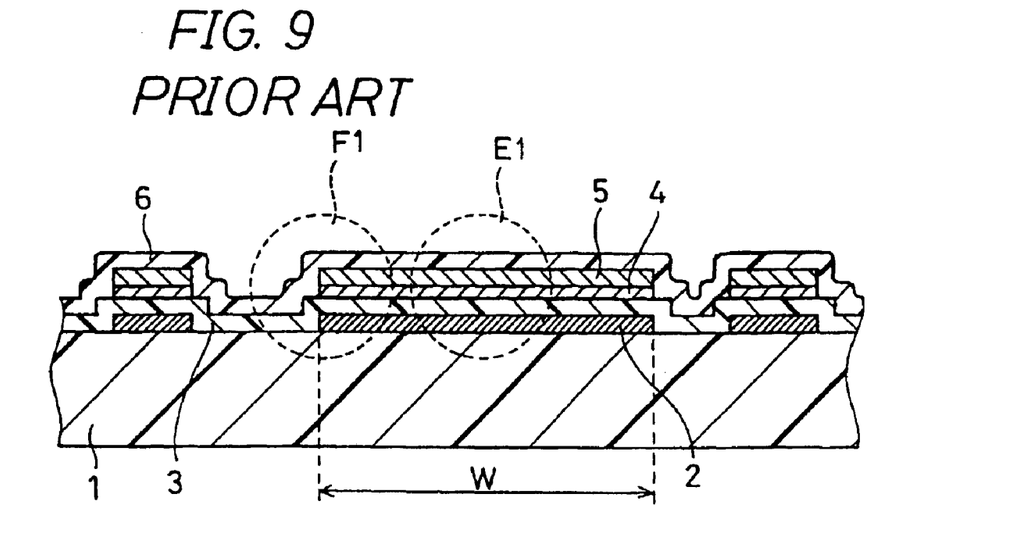
FIG. 9 is a sectional view in a direction at right angles with the direction of a current illustrating the structure of the input lead wiring in the conventional display panel.

FIGS. 8 and 9 are sectional views illustrating the structure of an input lead wiring in the conventional display panel, wherein FIG. 8 is a sectional view as viewed from a section in parallel with the direction of the current and FIG. 9 is a sectional view as viewed from a section perpendicular to the direction of the current.

First, a glass substrate is used as the insulating substrate 1, and a thin tantalum film is formed on the insulating substrate 1 by sputtering. Thereafter, an electrode wiring 2 of a first layer which is the lowermost layer of the input lead wiring is formed by patterning relying upon the photolithography technology.

Next, an SiNx film is formed as a gate-insulating film 3 in a desired pattern. On the gate-insulating film 3, there are formed an electrode wiring 4 of a second layer which is the electrode wiring of an indium tin oxide (ITO) and an electrode wiring 5 of a third layer which is a thin tantalum electrode wiring in predetermined patterns. Here, the electrode wirings are laminated to decrease the resistance of the input lead wiring.

Here, however, the thin tantalum film of the electrode wiring 2 of the first layer from which the gate-insulating film 3 has been partly removed, the thin tantalum film of the electrode wiring layer 5 of the third layer and the ITO film of the electrode wiring 4 of the second layer, are poorly adhering together and tend to be easily peeled off. The peeling of the films is due to a relationship between the thin tantalum film and the ITO film. That is, the thin tantalum film has a property of easily absorbing oxygen of the ITO film and tends to swell when it has once absorbed oxygen. Besides, when a thin tantalum film is formed on the ITO film, the ITO film becomes subject to be affected by the film stress from the thin tantalum film. This accounts for poor adhesion between the thin tantalum film and the ITO film, causing the films to be peeled off.

In order to decrease the peeling of film, it has heretofore been attempted as shown in FIG. 8 to limit the lengths of the electrically contacting portions C and D where the electrode wiring 2 of the first layer, the electrode wiring 4 of the second layer and the electrode wiring 5 of the third layer come into electric contact to be 100 μm or less in order to suppress the effect of film stress of the thin tantalum film upon the ITO film.

The input lead wirings other than those of the electrically contacting portions C and D are laminated one upon the other via the gate-insulating film 3 which adheres relatively favorably to the ITO film.

Referring next to FIG. 8, after the electrode wiring 5 of the third layer is formed, an insulating protection film 6 such as an SiNx film is formed except a connection portion P1 where the input lead wiring is connected to a connection pad 26 on the FPC side and a connection portion P2 where the input lead wiring is connected to a connection pad 27 on the side of the gate driver IC (hereinafter referred to as connection pad on the gate driver side).

After the insulating protection film 6 is formed, the input lead wiring, the connection pad 26 on the FPC side formed on the FPC board 25 and the connection pad 27 on the gate driver side formed on the gate driver 16, are connected together by being thermally press-adhered together by using an anisotropic conductive film (ACF) 28 which is obtained by mixing electrically conducting particles in a thermosetting resin film. Here, the regions E and F covered with the ACF 28 in the vicinities of the FPC board 25 and the gate driver 16 are about 0.2 mm to about 1.5 mm, and the input lead wirings are covered with the insulating protection film 6 in the regions other than the covering regions E and F.

The conventional input lead wiring is such that the electrode wiring 4 of the second layer which is the ITO electrode wiring is laminated on the electrode wiring 2 of the first layer via the gate-insulating film 3 which adheres relatively favorably to the ITO film. Further, the input lead wiring in the conventional display panel is such that various electrode wirings are laminated one upon the other to decrease the resistance of the input lead wiring and to prevent an increase in the wiring resistance.

In a flat portion E1 of the input lead wiring 21, further, the width W of the flat portion E1 of the input lead wiring shown in FIG. 9 is selected to be slightly as large as about 0.3 mm to about 1.5 mm to prevent an increase in the resistance of the input lead wiring. However, the flat portion E1 of the input lead wiring shown in FIG. 9 is accompanied by a problem in that the films tend to be peeled off. Besides, the edge portion F1 of the input lead wiring is accompanied by a problem of poor step coverage with the insulating protection film 6.

Figure 10:
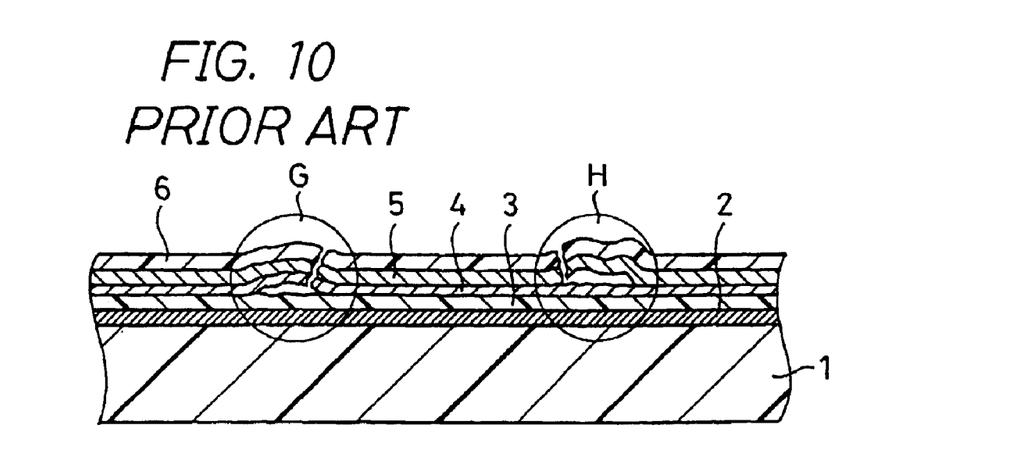
FIG. 10 is a sectional view illustrating a flat portion E of the input lead wiring in the conventional display panel.

FIG. 10 is a sectional view illustrating the flat portion E1 of the input lead wiring in the conventional display panel.

In the flat portion E1 of the input lead wiring, the film peels in the interface between the gate-insulating film 3 and the electrode wiring 4 of the second layer designated at G in FIG. 10 and in the interface between the electrode wiring 4 of the second layer and the electrode wiring 5 of the third layer designated at H in FIG. 10.

The peeling of film at the portions G and H shown in FIG. 10 is due to a decrease in the adhesion of the films caused by the stress in the thin tantalum film of when the electrode wiring 5 of the third layer is being formed, caused by the contamination of the underlying film and by the process after the electrode wiring 5 of the third layer is formed, e.g., by the thermal stress that generates when the input lead wiring is connected to the connection pad 26 of the FPC side and the connection pad 27 of the gate driver side by the thermal press adhesion by using the ACF 28.

Figure 11A:
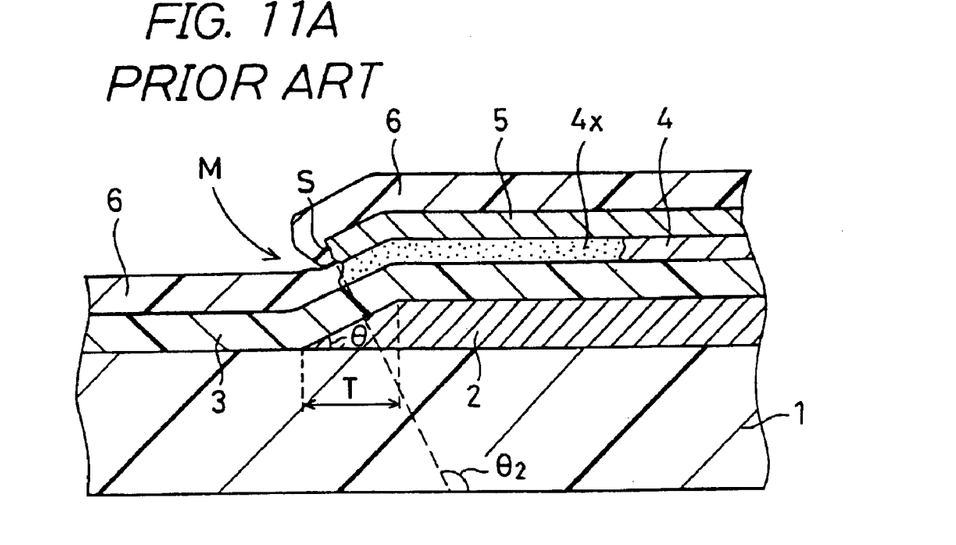
FIGS. 11A and 11B are sectional views illustrating an edge portion F of the input lead wiring in the conventional display panel.
Figure 11B:
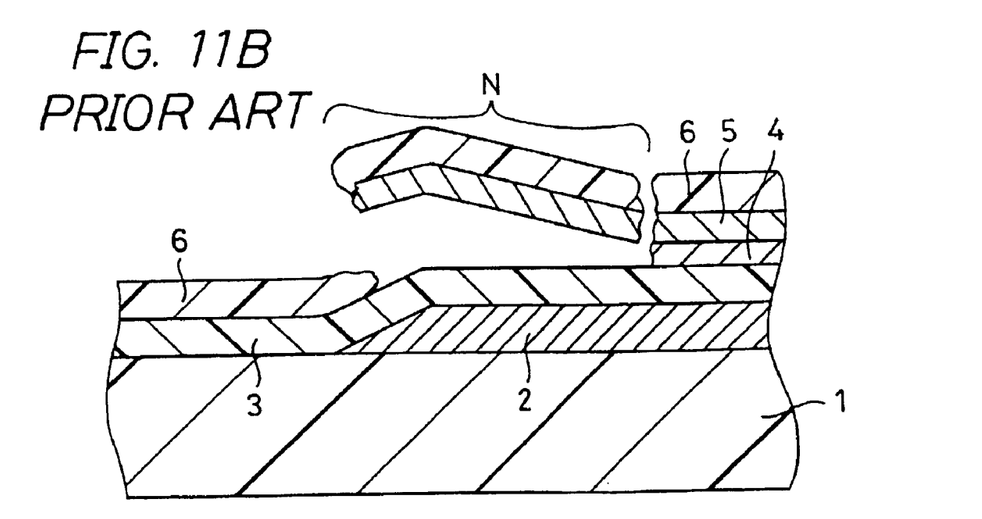

FIGS. 11A and 11B are sectional views illustrating an edge portion F of the input lead wiring in the conventional display panel.

Referring to FIG. 11A, the edge portion of the electrode wiring 2 of the first layer formed of the thin tantalum film is tapered so as to be favorably covered with the gate-insulating film 3. Here, the tapered shape is such that the thickness of the electrode wiring 2 gradually decreases toward the outer side (toward the left on the surface of the paper in FIGS. 11A and 11B), and that the upper surface of the electrode wiring 2 is inclined with respect to the surface of the insulating substrate 1, the angle θ subtended by the inclined surface and by the surface of the insulating substrate 1 being from 30° to 45° and the tapered length T being from 0.4 μm to 0.8 μm. Further, the electrode wiring 4 of the second layer and the electrode wiring 5 of the third layer are arranged on the electrode wiring 2 of the first layer via the gate-insulating film 3 so as to be overlapped on the edge portion of the electrode wiring 2 of the first layer. Therefore, the edge portions of the electrode wiring 4 of the second layer and of the electrode wiring 5 of the third layer are inversely tapered, and are poorly covered with the insulating protection film 6 positioned at an upper part of the electrode wiring 5 of the third layer. The inversely tapered shape stands for a shape in which the angle θ2 between the inclined surfaces S at the edge portions of the electrode wirings 4, 5 and the parallel surface of the insulating substrate 1 is not smaller than 90° in FIGS. 11A and 11B.

Herein, the step coverage stands for covering rugged portions of the underlying surface with the film in the step of forming the thin film on the surface of the substrate, and is also called step covering performance. When the step coverage becomes poor, the film poorly adheres and is peeled off.

The step coverage can be accomplished by increasing the thickness of the insulating protection film 6 resulting, however, in a decrease in the processing ability and an increase in the cost. By taking the processing ability and cost into consideration, therefore, the thickness of the insulating protection film 6 is selected to be 330 nm which is an optimum film thickness derived through experiment.

When a current-flowing test is conducted in an environment of a high temperature and a high humidity, e.g., a temperature of 50° C. and a relative humidity of 95% in a state of a poor step coverage, the insulating protection film 6 at the edge portion M is cracked as shown in FIG. 11A, and the electrode wiring 4x of the second layer which is the ITO electrode wiring is electrically corroded being affected by the humidity and electric current. Here, the electric corrosion stands for a phenomenon wherein when electrically conducting metals of different kinds are brought in contact with each other, the metal having a larger ionization tendency is corroded.

When the ITO electrode wiring 4x is split off due to electric corrosion, the electrode wiring 5 of the third layer and the insulating protection film 6 positioned thereon become an electrically conducting peeled piece N as shown in FIG. 11B. Being affected by the electric corrosion, the neighboring input lead wiring that is similarly peeled off and the electrically conducting peeled piece N cause a current to leak between the electrodes giving rise to the occurrence of erroneous operation.

SUMMARY OF THE INVENTION

It is an object of the invention to provide a laminated structure of wirings capable of preventing a plurality of electrode wirings constituting an input lead wiring from peeling, and of decreasing the number of production steps and the cost of production, and further provide a display panel using the laminated structure of wirings.

The invention provides a display panel comprising an insulating substrate; gate electrode wirings and source electrode wirings arranged on the insulating substrate like a matrix according to display pixels; switching elements arranged in individual regions surrounded by the gate electrode wirings and the source electrode wirings, the switching elements being electrically connected to the gate electrode wirings and to the source electrode wirings; pixel electrodes selectively driven by the switching elements; and an input lead wiring having a laminated layer structure for connecting the electrode wirings and the pixel electrodes to a drive power source, wherein the input lead wiring having the laminated layer structure is constituted by the electrode wirings of two or more layers, and the electrode wirings of the second and higher layers are all constituted by a plurality of parallel wirings having maximum widths of 300 µm or less.

According to the invention, the electrode wirings of the second and higher layers forming the input lead wiring of the laminated layer structure, are constituted by a plurality of parallel wirings having maximum widths of 300 µm or less. It is therefore made possible to disperse the stress that builds up in the film when the electrode wiring of the third layer is formed as well as to disperse the thermal stress that generates during the process after the electrode wiring of the third layer is formed without increasing the resistance of the input lead wiring. By maintaining intimate adhesion between the electrode wiring material of the second and higher layers and the underlying layer, therefore, the films are prevented from being peeled off.

Further, the invention provides a display panel comprising an insulating substrate; gate electrode wirings and source electrode wirings arranged on the insulating substrate like a matrix according to display pixels; switching elements arranged in individual regions surrounded by the gate electrode wirings and the source electrode wirings, the switching elements being electrically connected to the gate electrode wirings and to the source electrode wirings; pixel electrodes selectively driven by the switching elements; and an input lead wiring having a laminated layer structure for connecting the electrode wirings and the pixel electrodes to a drive power source, wherein the input lead wiring having the laminated layer structure is constituted by the electrode wirings of two or more layers, and the electrode wirings of the second and higher layers forming the input lead wiring of the laminated layer structure are not overlapped on edge portions on both sides of the electrode wiring of the lowermost layer.

According to the invention, the electrode wirings of the second and higher layers forming the input lead wiring of the laminated layer structure, are not overlapped on the edge portions on both sides of the electrode wiring of the first layer which is the lowermost layer. Therefore, the edge portions of the electrode wiring of the second layer and of the electrode wiring of the third layer are prevented from being inversely tapered, enabling the common edge portions of the electrode wiring of the second layer and of the electrode wiring of the third layer to be favorably covered with the insulating protection film and, hence, preventing the films from being peeled off.

The invention provides a display panel comprising an insulating substrate; gate electrode wirings and source electrode wirings arranged on the insulating substrate like a matrix according to display pixels; switching elements arranged in individual regions surrounded by the gate electrode wirings and the source electrode wirings and are electrically connected to the gate electrode wirings and to the source electrode wirings; pixel electrodes selectively driven by the switching elements; and an input lead wiring having a laminated layer structure for connecting the electrode wirings and the pixel electrodes to a drive power source, wherein the input lead wiring having the laminated layer structure is constituted by the electrode wirings of two or more layers, and the electrode wirings of the second and higher layers are all constituted by a plurality of parallel wirings having maximum widths of 300 µm or less, and the electrode wirings of the second and higher layers forming the input lead wiring of the laminated layer structure are not overlapped on edge portions on both sides of the electrode wiring of the lowermost layer.

According to the invention, the electrode wirings of the second and higher layers forming the input lead wiring of the laminated layer structure, are all constituted by a plurality of parallel wirings having maximum widths of 300 µm or less. It is therefore made possible to disperse the stress that builds up in the film when the electrode wiring of the third layer is formed as well as to disperse the thermal stress that generates during the process after the electrode wiring of the third layer is formed without increasing the resistance of the input lead wiring. By maintaining intimate adhesion between the electrode wirings of the second and higher layers and the underlying layer, therefore, the films are prevented from being peeled off. Further, the plurality of parallel wirings are not overlapped on the edge portions on both sides of the electrode wiring of the first layer which the lowermost layer. Therefore, the edge portions of the electrode wiring of the second layer and of the electrode wiring of the third layer are prevented from being inversely tapered, enabling the common edge portions of the electrode wiring of the second layer and of the electrode wiring of the third layer to be favorably covered with the insulating protection film and, hence, preventing the films from being peeled off.

In the invention it is preferable that the input lead wiring having the laminated layer structure is constituted by the electrode wirings of three layers, the electrode wiring of a first layer of the three layers which is the lowermost layer and the gate electrode wiring are formed of the same material at the same step, the electrode wiring of a second layer of the three layers and the pixel electrodes are formed of the same material at the same step, and the electrode wiring of a third layer of the three layers and the source electrode wiring are formed of the same material at the same step.

According to the invention, the input lead wiring having the laminated layer structure is constituted by the electrode wirings of three layers. Besides, the electrode wiring of the first layer which is the lowermost layer and the gate electrode wiring, the electrode wiring of the second layer and the pixel electrodes, and the electrode wiring of the third layer and the source electrode wiring, are formed of the same materials and at the same steps, making it possible to decrease the number of the production steps and the cost of production.

In the invention it is preferable that the input lead wiring having the laminated layer structure is such that an insulating film is interposed between the electrode wiring of the first layer and the electrode wiring layer of the second layer and the insulating protection film is formed on the electrode wiring of the uppermost layer.

According to the invention, the insulating film is interposed between the electrode wiring of the first layer and the electrode wiring of the second layer, making it possible to improve adhesion between the electrode wiring of the first layer and the electrode wiring of the second layer. Further, since the insulating protection film is formed on the electrode wiring of the uppermost layer, there are realized wirings maintaining good electric insulation.

The invention prevents moisture from entering through cracks in the insulating protection film, completely prevents the occurrence of electric corrosion, and makes it possible to improve reliability of the display panel without increasing the thickness of the insulating protection film.

Further, the invention provides a laminated structure of wirings comprising electrode wirings of two or more layers, the electrode wirings of the second and higher layers all being a plurality of parallel wirings having maximum widths of 300 μm or less.

According to the invention, the electrode wirings of the second and higher layers of the laminated layer structure formed on the substrate constituting a display panel, are constituted by a plurality of parallel wirings having maximum widths of 300 μm or less. It is therefore made possible to disperse the stress that builds up in the film when the electrode wiring of the third layer is formed as well as to disperse the thermal stress that generates during the process after the electrode wiring of the third layer is formed without increasing the resistance of the wiring. By maintaining intimate adhesion between the electrode wirings of the second and higher layers and the underlying layer, therefore, the films are prevented from being peeled off.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
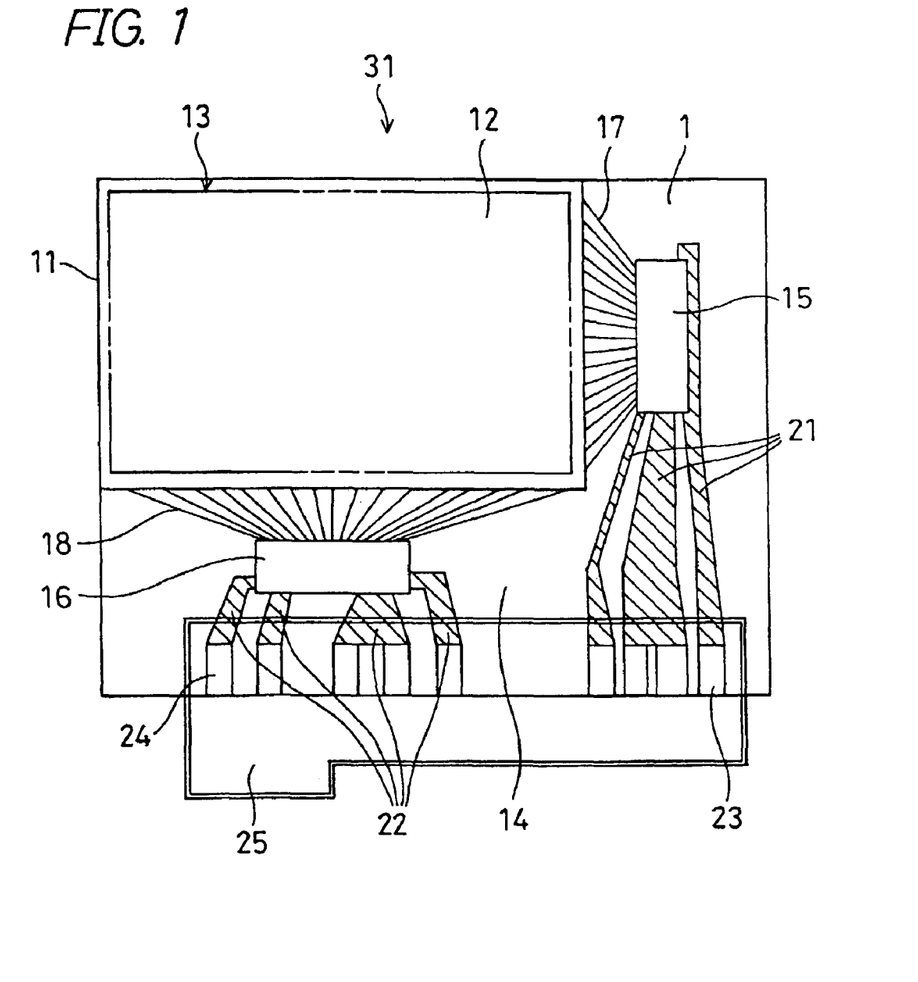
FIG. 1 is a plan view illustrating the constitution of a display panel 31 according to an embodiment of the invention.

FIG. 1 is a plan view illustrating the constitution of a display panel 31 according to an embodiment of the invention.

The display panel 31 is constituted by a liquid crystal display device 11 that includes a gate electrode wiring 17, a source electrode wiring 18, input lead wirings 21, 22 and external connection terminals 23, 24, and by a gate driver IC (hereinafter referred to as gate driver) 15, a source driver IC (hereinafter referred to as source driver) 16, and a flexible printed circuit (FPC) board 25.

The liquid crystal display device 11 includes a rectangular insulating substrate 1 and a rectangular opposing substrate 12 which is made of an insulating material and is smaller than the insulating substrate 1. The insulating substrate 1 and the opposing substrate 12 are arranged being opposed to each other in a manner that a corner portion of the insulating substrate 1 is overlapped on a corner portion of the opposing substrate 12, and a liquid crystal layer is sealed between the insulating substrate 1 and the opposing substrate 12. The region where the liquid crystal layer is sealed between the insulating substrate 1 and the opposing substrate 12, works as a display region 13. The shapes of the substrates and the positions where they are overlapped are not limited to those mentioned above.

A drive wiring region 14 is provided surrounding the display region 13 on the insulating substrate 1. Here, the gate driver 15 and the source driver 16 which are the driver ICs for driving the liquid crystals, are mounted on the drive wiring region 14 by the chip-on-glass (COG) system. A plurality of gate electrode wirings 17 and source electrode wirings 18 of predetermined patterns drawn from the display region 13, are connected to the output sides of the gate driver 15 and of the source driver 16.

On the input sides of the gate driver 15 and of the source driver 16, there are formed a plurality of input lead wirings 21, 22 for signals and for a power source, as well as external connection terminals 23 and 24 continuous to the input lead wirings 21, 22, and being electrically connected to the gate driver 15 and to the source driver 16.

Further, the FPC board 25 is connected to the external connection terminals 23 and 24. Here, the FPC board is a film-like board having circuits and, chiefly, wiring, which are formed by sticking a copper foil on the surface of a flexible film. Because of its small thickness and flexibility, the FPC board is used for connecting the substrates or parts having dissimilar shapes together.

The power source voltage and signals sent from the FPC board 25 are input to the gate driver 15 and to the source driver 16 through the input lead wirings 21 and 22. Signals output from the gate driver 15 and the source driver 16 are sent to the display region 13 through the gate electrode wiring 17 and the source electrode wiring 18 which are output wirings, whereby thin-film transistor (TFT) elements which are the switching elements provided in the liquid crystal display device 11 are driven to display a desired image.

Figure 2A:
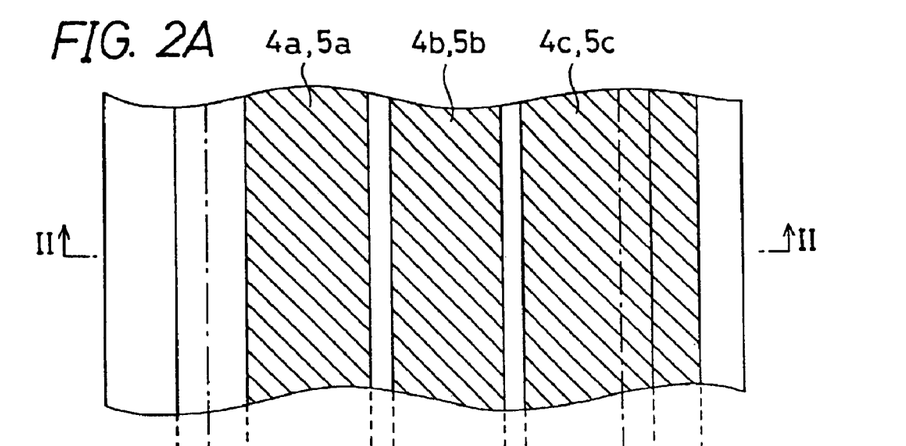
FIGS. 2A and 2B are a partial plan view and a sectional view illustrating input lead wirings 21 in the display panel 31 according to the embodiment of the invention.
Figure 2B:
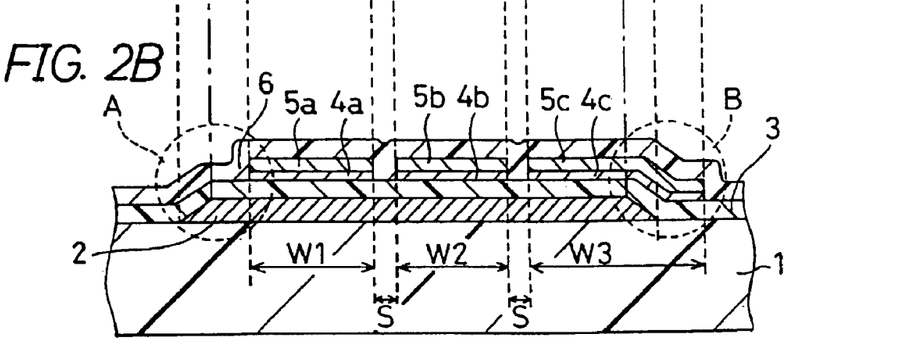

FIGS. 2A and 2B are a partial plan view and a sectional view illustrating the input lead wiring 21 in the display panel 31 according to an embodiment of the invention. Namely, FIG. 2A is a partial plan view illustrating the input lead wiring 21 in the display panel 31, and FIG. 2B is a sectional view of when FIG. 2A is viewed along a cutting line II—II.

The structure of the input lead wiring 21 in the display panel 11 and the procedure of fabrication thereof according to the embodiment will now be described with reference to FIGS. 2A and 2B. The structure of the input lead wiring 22 and the procedure of fabrication thereof are the same as those of the input lead wiring 21. Therefore, the input lead wiring 22 is fabricated simultaneously with the input lead wiring 21.

First, a glass substrate is used as the insulating substrate 1, and a thin film of tantalum or titanium is grown on the insulating substrate 1 by sputtering. Next, the thin film is patterned relying upon the photolithography technology to form an electrode wiring 2 of a first layer which is the lowermost layer constituting the input lead wiring 21. Here, the electrode wiring 2 of the first layer and the gate electrode wiring 17 from the liquid crystal display device 11 are formed of the same material at the same step and simultaneously.

In the display region 13, the source electrode wiring 18 is arranged in the form of a matrix intersecting the gate electrode wiring 17 above the gate electrode wiring 17, and are subject to be broken down. In order to avoid the breakage, therefore, the edge portions of the gate electrode wiring 17 are tapered. Here, the tapered shape is such that the thickness of the gate electrode wiring 17 gradually decreases toward the outer side (in the right-and-left direction on the surface of the paper in FIGS. 2A and 2B), and that the upper surface of the gate electrode wiring 17 is inclined with respect to the surface of the insulating substrate 1, the angle θ subtended by the inclined surface and by the surface of the insulating substrate 1 being from 30° to 45° and the tapered length T being from 0.4 μm to 0.8 μm. Therefore, the edge portions of the electrode wiring 2 of the first layer, too, are tapered like the edge portions of the gate electrode wiring 17.

The sputtering method and the photolithography method will now be described. The sputtering method is the one for forming a thin film by impinging argon atoms of high energy upon a disk called target of a metal or a silicide which is a compound of silicon and a high-melting metal in a high degree of vacuum, so that the atoms jumping out being hit by argon atoms deposit on the surface of the wafer.

In the production of ICs, the photolithography applies a photosensitive resin onto the surface of the wafer which is, then, exposed to light through a photomask corresponding to a circuit pattern that is to be formed. Thereafter, a predetermined pattern is formed at the steps of developing, etching and peeling.

Next, an SiNx film is grown as the gate-insulating film 3 on the electrode wiring 2 of the first layer by sputtering so as to possess a thickness of 300 nm to 350 nm and a predetermined pattern is formed by patterning. Here, the gate-insulating film 3 is formed except the portions that connect to the gate driver 15, source driver 16 and FPC board 25.

Then, there are continuously grown by sputtering electrode wiring portions 4a, 4b and 4c that constitute the electrode wiring 4 of the second layer which is an indium tin oxide (ITO) electrode wiring, and electrode wiring portions 5a, 5b and 5c that constitute the electrode wiring 5 of the third layer which is a thin tantalum electrode wiring. Here, the electrode wiring 4 of the second layer has a thickness of 150 nm, and the electrode wiring 5 of the third layer has a thickness of 200 nm to 300 nm. Further, the electrode wiring 5 of the third layer and the electrode wiring 4 of the second layer are patterned in this order by photolithography to laminate the electrode wiring 4 of the second layer and the electrode wiring 5 of the third layer on the gate-insulating film 3. More closely, the electrode wirings of the second and higher layers forming the input lead wiring 21 of the laminated layer structure are arranged in parallel, i.e., the electrode wiring 4 of the second layer and the electrode wiring 5 of the third layer on the gate-insulating film 3, are arranged in parallel in such a manner that a gap is maintained among the electrode wiring portions 4a, 5a having a width W1, electrode wiring portions 4b, 5b having a width W2, and electrode wiring portions 4c, 5c having a width W3, such that the gap between the electrode wiring portions 4a, 5a and 4b, 5b is S and that the gap between the electrode wiring portions 4b, 5b and 4c, 5c is S, respectively. Here, the plurality of wiring portions arranged in parallel have widths W1, W2 and W3, a maximum width being 300 μm or less. In this embodiment, the width S among the electrode portions is 10 μm.

Further, the electrode wiring portions 4a, 4b and 4c of the second layer are formed of the same material as the pixel electrodes of ITO film in the display region 13, and are formed at the same step, and the electrode wiring portions 5a, 5b and 5c of the third layer are formed of the same material as the source signal electrode wiring of thin tantalum film and at the same step.

Finally, the input lead wiring 21 is entirely covered with the insulating protection film 6 which is the SiNx film having a thickness of 330 nm except the portions connected to the gate driver 15, source driver 16 and FPC board 25. This makes it possible to realize a wiring maintaining good electric insulation.

In this embodiment as described above, the electrode wirings of the second and higher layers forming the input lead wiring 21 are constituted by arranging in parallel the plurality of electrode wiring portions having widths W1, W2 and W3. As for setting the widths, the electrode wiring portions are so formed as to possess a maximum width of 300 μm or less as judged from the results of peeling after the patterns are formed on the substrate of the display panel that is really manufactured, as shown in Table 1 below.

TABLE 1

| | Electrode width: W | | | | | | | | |
|---|---|---|---|---|---|---|---|---|---|
| | 50 μm | 100 μm | 200 μm | 300 μm | 400 μm | 500 μm | 700 μm | 1,000 μm | 1,200 μm |
| Electrode films of 2nd and higher layers peeled | No ○ | No ○ | No ○ | No ○ | Yes X | Yes X | Yes X | Yes X | Yes X |
| Film stress (MPa) | 513 | 697 | 853 | 1,013 | 1,267 | 1,682 | 1,893 | 2,319 | 2,443 |

Figure 3:
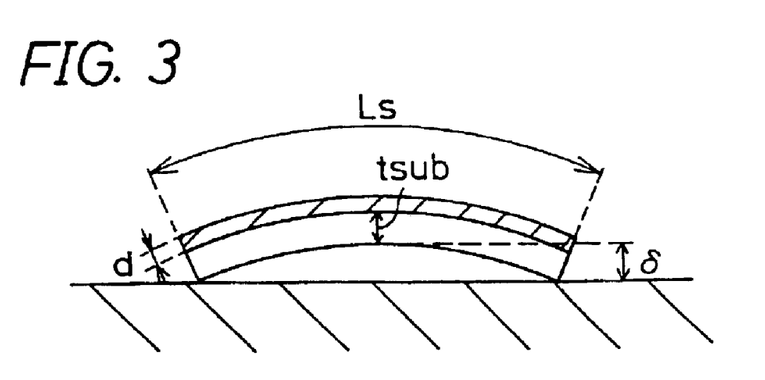
FIG. 3 is a view schematically illustrating a parameter used for finding a stress in the film.

Further, the stress in the film is evaluated in compliance with the following formula (1), $$\sigma = E_s \cdot t_{sub}^2 \cdot \delta / 2 \cdot L_s^2 \cdot d \qquad (1)$$

where σ is a stress in the film, δ is a warping amount of the substrate, $E_s$ is a Young's modulus of the substrate, $t_{sub}$ is a thickness of the substrate, $L_s$ is a length of the substrate, and d is a thickness of the film. FIG. 3 is a view schematically illustrating a parameter used for finding the stress in the film.

Figure 4:
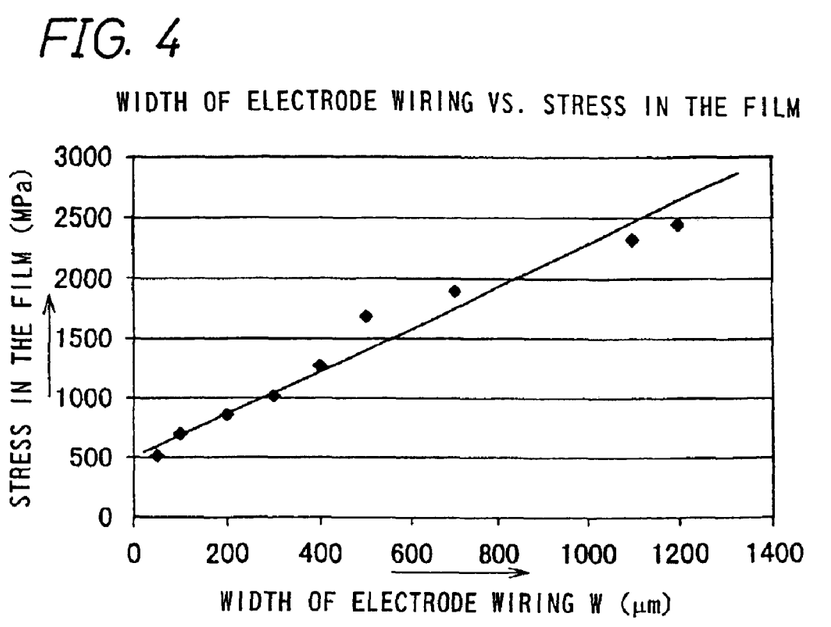
FIG. 4 is a graph illustrating a relationship between the width W of the electrode wiring and the stress in the film.

The stress is evaluated through the calculation by measuring the warping amount of the substrate of when the tantalum film (300 nm) is worked to possess the wire widths on the silicon wafer (50 mm square×0.5 mm thick) FIG. 4 is a graph illustrating a relationship between the width W of the electrode wiring and the stress in the film. From Table 1, it will be understood that the stress in the film must be suppressed to be 1,267 Mpa or less at the time of forming the electrode wiring 5 of the third layer which is the thin tantalum electrode wiring.

As described above, the electrode wiring portions constituting the electrode wirings 4 and 5 are formed to possess maximum widths of 300 μm or less thereby to disperse the stress that builds up in forming the electrode wiring 5 of the third layer which is the thin tantalum electrode wiring and to disperse the thermal stress that generates at the process after the electrode wiring 5 of the third layer is formed. By maintaining intimate adhesion between the electrode wirings of the second and higher layers and the underlying layer, therefore, the films are prevented from being peeled off. Here, after the formation of the electrode wiring 5 of the third layer that generates thermal stress, the process is carried out in order to thermally press-adhere, for example, the input lead wiring 21, connection pad 26 on the FPC side and the connection pad 27 on the gate driver side by using the ACF 28.

Further, the input lead wiring 21 is so formed that the sum of the widths W1, W2 and W3 of the plurality of electrode wiring portions becomes equal to the width of the electrode wiring 2 of the first layer. It is therefore allowed to prevent the films from being peeled off without increasing the resistance of the input lead wiring 21.

Moreover, the electrode wiring 2 and gate electrode wiring 17 of the first layers, electrode wirings 4a, 4b, 4c and pixel electrodes of the second layers, and the electrode wirings 5a, 5b, 5c and source electrode wiring 18 of the third layers, are formed of the same materials and at the same steps, respectively, making it possible to decrease the number of the production steps and the cost of production.

Figure 5:
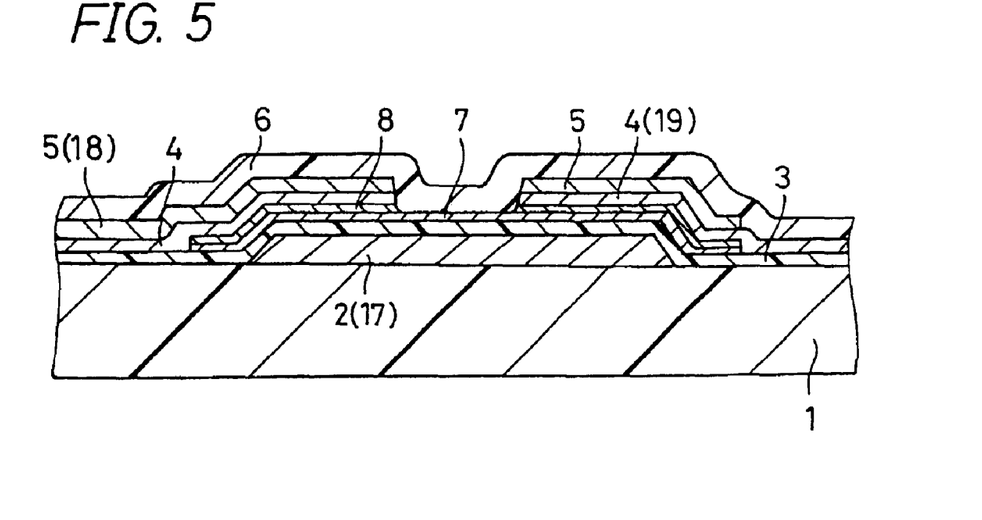
FIG. 5 is a sectional view illustrating the structure of laminated layers near the pixel electrodes.

FIG. 5 is a sectional view illustrating the laminated layer structure near the pixel electrode. The gate electrode wiring 17 is formed in a predetermined pattern on the insulating substrate 1 by using the same material as the electrode wiring 2 of the first layer at the same step. The gate-insulating film 3 is formed covering the electrode wiring 2 of the first layer. An intrinsic semiconductor amorphous silicon film (a–Si–i layer) is formed maintaining a thickness of 60 nm to 130 nm as a semiconductor layer 7 on the gate-insulating film 3 at a position where it is overlapped on the gate electrode wiring 17. There is further formed, on the semiconductor layer 7, an n⁺-type microcrystalline silicon film (μc–n+Si layer) maintaining a thickness of 50 nm to 100 nm as a contact layer 8 at positions corresponding to the source region and the drain region.

The electrode wiring 4 of the second layer which is the ITO electrode wiring is formed covering the gate-insulating film 3 and the contact layer 8. The electrode wiring 4 of the second layer is not formed in a region between the two contact layers 8. The electrode wiring 4 formed at a position (right side on the surface of the paper in FIG. 5) corresponding to the drain region, is a pixel electrode 19. On the electrode wiring 4 of the second layer is further formed the electrode wiring 5 of the third layer. Like the second electrode wiring, the electrode wiring 5 of the third layer is not formed in the region between the two contact layers 8. On the side of the pixel electrode 19, the electrode wiring 5 of the third layer is formed at a position overlapped on the contact layer 8. The electrode wirings 4, 5 of the second and third layers formed on the side of the source region constitute a source electrode wiring 18.

Figure 6A:
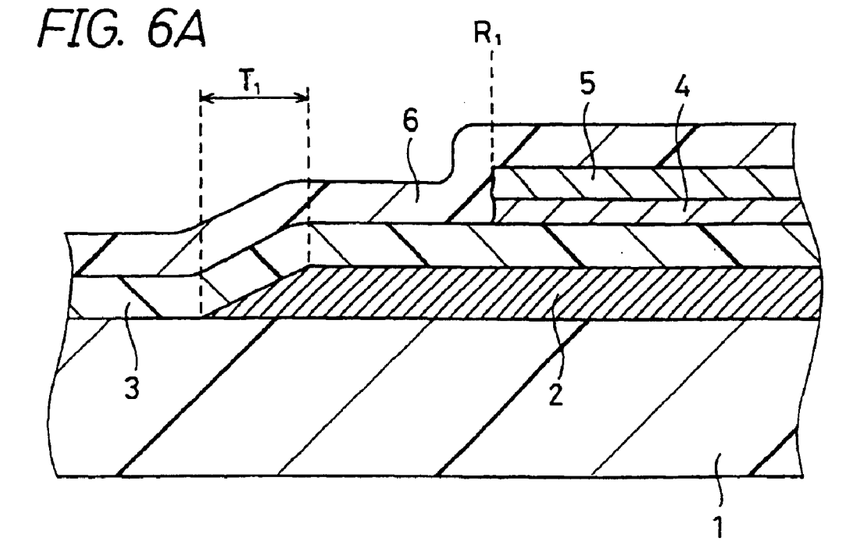
FIGS. 6A and 6B are sectional views illustrating, on an enlarged scale, a region A shown in FIG. 2B.
Figure 6B:
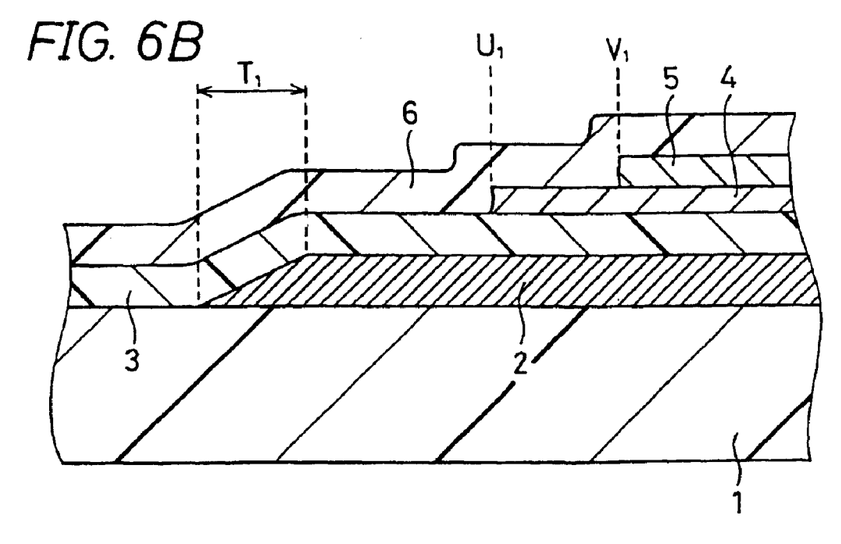

FIGS. 6A and 6B are sectional views illustrating the region A shown in FIG. 2B on an enlarged scale. Hereinafter, the region A is referred to as edge portion A.

Referring to FIG. 6A, the edge portion A of the input lead wiring 21 shown in FIG. 2B has the electrode wiring 4 of the second layer which is the ITO electrode wiring and the electrode wiring 5 of the third layer which is the thin tantalum electrode wiring, which are the electrode wirings of the second and higher layers and are laminated, through the gate-insulating film 3, on a flat portion of the electrode wiring 2 of the first layer which is the lowermost layer. Besides, a common edge portion $R_1$ of the electrode wiring 4 of the second layer and of the electrode wiring 5 of the third layer, is so arranged as will not be overlapped on the tapered region $T_1$ at the edge of the electrode wiring 2 of the first layer.

At the edge portion A of the input lead wiring 21, the electrode wiring 4 of the second layer and the electrode wiring 5 of the third layer are arranged as described above to improve the step coverage of the common edge portion $R_1$ of the electrode wiring 4 of the second layer and of the electrode wiring 5 of the third layer with the insulating protection film 6. This prevents the films from peeling at the edge portion of the electrode wiring 4 of the second layer and of the electrode wiring 5 of the third layer, since the edge portion has no longer been formed in an inversely tapered shape unlike that of the prior art.

Further, the electrode wiring 4 of the second layer and the electrode wiring 5 of the third layer forming the input lead wiring 21 may be so arranged that the edge portion of the electrode wiring 4 of the second layer and the edge portion of the electrode wiring 5 of the third layer establish a positional relationship that is shown in FIG. 6B.

Namely, the electrode wiring 4 of the second layer and the electrode wiring 5 of the third layer are so patterned and laminated that a distance between the tapered region $T_1$ at the edge of the electrode wiring 2 of the first layer and the edge portion $V_1$ of the electrode wiring 5 of the third layer is greater than a distance between the tapered region $T_1$ at the edge and the edge portion $U_1$ of the electrode wiring 4 of the second layer, and that neither the edge portion $U_1$ of the electrode wiring 4 of the second layer nor the edge portion $V_1$ of the electrode wiring 5 of the third layer overlaps the tapered region $T_1$ at the edge.

As described above, the electrode wiring 4 of the second layer and the electrode wiring 5 of the third layer are formed stepwise, and the thicknesses of the electrode wiring 4 of the second layer and of the electrode wiring 5 of the third layer, that must be covered with the insulating protection film 6, are divided to further improve the step coverage at the edge portion $U_1$ of the electrode wiring 4 of the second layer and at the edge portion $V_1$ of the electrode wiring 5 of the third layer with the insulating protection film 6, making it possible to prevent the films from being peeled off.

Figure 7A:
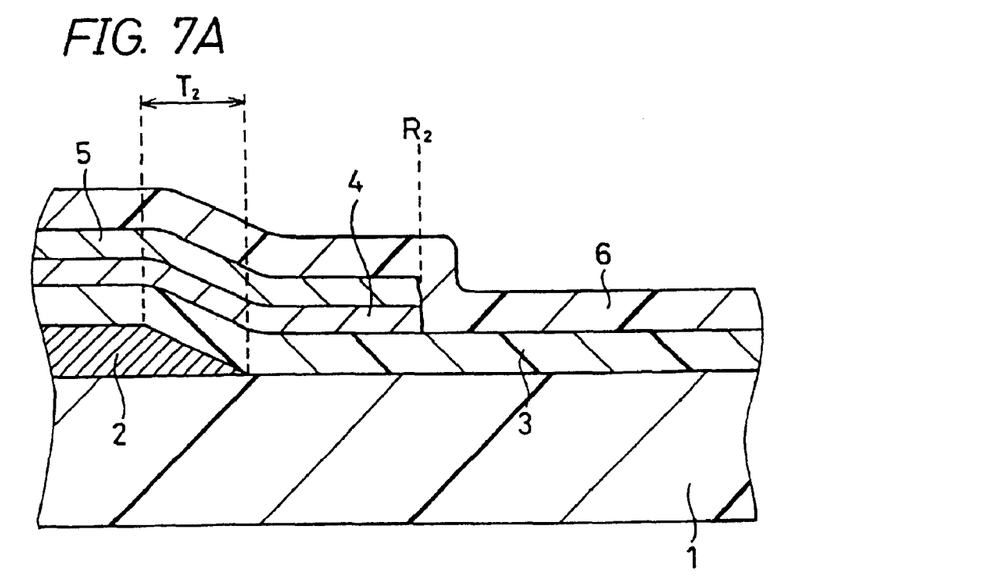
FIGS. 7A and 7B are sectional views illustrating, on an enlarged scale, a region B shown in FIG. 2B.
Figure 7B:
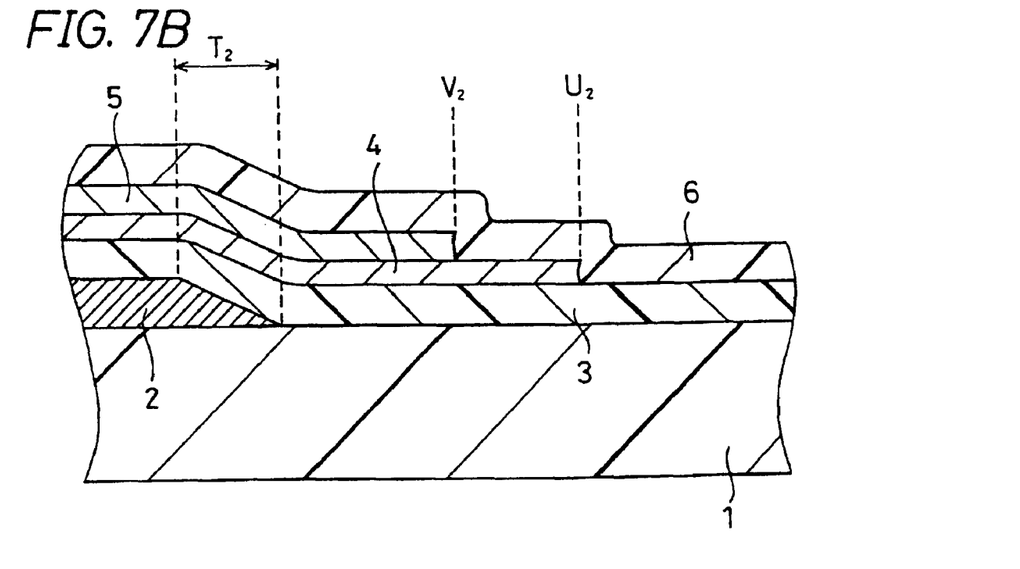

FIGS. 7A and 7B are sectional views illustrating the region B shown in FIG. 2B on an enlarged scale. Hereinafter, the region B is referred to as edge portion B.

Referring to FIG. 7A, the edge portion B of the input lead wiring 21 has the electrode wiring 4 of the second layer which is the ITO electrode wiring and the electrode wiring 5 of the third layer which is the thin tantalum electrode wiring, which are the electrode wirings of the second and higher layers and are laminated, through the gate-insulating film 3, on a tapered portion of the electrode wiring 2 of the first layer which is inclining along the edge portion thereof. Besides, a common edge portion $R_2$ of the electrode wiring 4 of the second layer and of the electrode wiring 5 of the third layer, is so arranged as will not be overlapped on the tapered region $T_2$ at the edge of the electrode wiring 2 of the first layer.

At the edge portion B of the input lead wiring 21, the electrode wiring 4 of the second layer and the electrode wiring 5 of the third layer are arranged as described above to improve the step coverage of the common edge portion $R_2$ of the electrode wiring 4 of the second layer and of the electrode wiring 5 of the third layer with the insulating protection film 6. This prevents the films from peeling at the edge portion of the electrode wiring 4 of the second layer and of the electrode wiring 5 of the third layer, since the edge portion has no longer been formed in an inversely tapered shape unlike that of the prior art.

Further, the electrode wiring 4 of the second layer and the electrode wiring 5 of the third layer forming the input lead wiring 21 may be so arranged that the edge portion of the electrode wiring 4 of the second layer and the edge portion of the electrode wiring 5 of the third layer establish a positional relationship that is shown in FIG. 7B.

Namely, the electrode wiring 4 of the second layer and the electrode wiring 5 of the third layer are so patterned and laminated that a distance between the tapered region $T_2$ at the edge of the electrode wiring 2 of the first layer and the edge portion $U_2$ of the electrode wiring 4 of the second layer is greater than a distance between the tapered region $T_2$ at the edge and the edge portion $V_2$ of the electrode wiring 5 of the third layer, and that neither the edge portion $U_2$ of the electrode wiring 4 of the second layer nor the edge portion $V_2$ of the electrode wiring 5 of the third layer overlaps the tapered region $T_2$ at the edge.

As described above, the electrode wiring 4 of the second layer and the electrode wiring 5 of the third layer are formed stepwise, and the thicknesses of the electrode wiring 4 of the second layer and of the electrode wiring 5 of the third layer, that must be covered with the insulating protection film 6, are divided to further improve the step coverage at the edge portion $U_2$ of the electrode wiring 4 of the second layer and at the edge portion $V_2$ of the electrode wiring 5 of the third layer with the insulating protection film 6, making it possible to prevent the films from being peeled off.

Upon improving the step coverage of the insulating protection film 6, further, the films are favorably adhered at the edge portion of the electrode wiring 4 of the second layer and of the electrode wiring 5 of the third layer without developing cracks in the insulating protection film 6. Therefore, moisture is prevented from entering through cracks into the insulating protection film 6, electric corrosion is completely prevented from taking place, and it is allowed to improve reliability of the display panel 31 without increasing the thickness of the insulating protection film 6.

Though the above embodiment has dealt with the wiring having the laminated layer structure formed on the substrate used in the display panel, the invention can similarly be applied even to those wirings having a laminated layer structure that are used not being limited to the display panels only. Further, the insulating film needs not be interposed between the wiring of the first layer and the wiring of the second layer. In this case, however, the adhesion becomes inferior between the wiring of the first layer and the wiring of the second layer. Though the electrode wiring portions constituting the electrode wiring have a width of 300 μm or less, the width is better further narrowed since the stress in the film increases with an increase in the thickness of the film. It further becomes necessary to decrease the width of the electrode wiring portions depending upon the materials and the conditions for forming the films.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A laminated structure of wirings comprising
conductive electrode wirings of two or more layers,
the electrode wirings of the second and higher layers all being a plurality of parallel wirings having maximum widths of 300 μm or less, and the lowermost wiring being a single conductive wiring so that the plurality of parallel wirings of the second and higher layers are supported by the single wiring of the lowermost wiring.

2. A display panel including a plurality of pixels and comprising:
an insulating substrate;
gate electrode wirings and source electrode wirings supported by at least the insulating substrate;
switching elements electrically connected to the gate electrode wirings and to the source electrode wirings;
pixel electrodes selectively driven by the switching elements; and
an input lead wiring having a laminated layer structure for connecting the gate and/or source electrode wirings and the pixel electrodes to at least one drive power source,
wherein the input lead wiring having the laminated layer structure comprises electrode wirings of two or more layers, and the electrode wirings of the second and higher layers all at least partially overlap a lowermost electrode wiring layer of the laminated layer substrate, and wherein each of the second and higher layers comprises a plurality of at least partially parallel wirings having maximum widths of 300 μm or less.

3. The display panel of claim 1, wherein the input lead wiring having the laminated layer structure comprises electrode wirings of three layers, the electrode wiring of a first layer of the three layers which is the lowermost layer and the gate electrode wiring are formed of the same material at the same step, the electrode wiring of a second layer of the three layers and the pixel electrodes are formed of the same material at the same step, and the electrode wiring of a third layer of the three layers and the source electrode wiring are formed of the same material at the same step.

4. The display panel of claim 1, wherein the input lead wiring having the laminated layer structure is such that an insulating film is interposed between the electrode wiring of the first layer and the electrode wiring layer of the second layer and the insulating protection film is formed on the electrode wiring of the uppermost layer.

5. The display panel of claim 3, wherein the input lead wiring having the laminated layer structure is such that an insulating film is interposed between the electrode wiring of the first layer and the electrode wiring layer of the second layer and the insulating protection film is formed on the electrode wiring of the uppermost layer.

6. A display panel comprising:
an insulating substrate;
gate electrode wirings and source electrode wirings arranged on the insulating substrate like a matrix;
switching elements arranged in individual regions surrounded by the gate electrode wirings and the source electrode wirings, the switching elements being electrically connected to the gate electrode wirings and to the source electrode wirings;
pixel electrodes selectively driven by the switching elements; and
an input lead wiring having a laminated layer structure for connecting the electrode wirings and the pixel electrodes to a drive power source,
wherein the input lead wiring having the laminated layer structure is constituted by the electrode wirings of two or more layers, and proceeding along a length of the input lead wiring right and left edges of the electrode wirings of the second and higher layers forming the input lead wiring of the laminated layer structure do not overlap right and left edges of the electrode wiring of the lowermost layer.

7. A display panel comprising:
an insulating substrate;
gate electrode wirings and source electrode wirings arranged on the insulating substrate like a matrix according to display pixels;
switching elements arranged in individual regions surrounded by the gate electrode wirings and the source electrode wirings and are electrically connected to the gate electrode wirings and to the source electrode wirings;
pixel electrodes selectively driven by the switching elements; and
an input lead wiring having a laminated layer structure for connecting the electrode wirings and the pixel electrodes to a drive power source,
wherein the input lead wiring having the laminated layer structure is constituted by the electrode wirings of two or more layers, and the electrode wirings of the second and higher layers are all constituted by a plurality of parallel wirings having maximum widths of 300 µm or less, and the electrode wirings of the second and higher layers forming the input lead wiring of the laminated layer structure are not overlapped on edge portions on both sides of the electrode wiring of the lowermost layer.

8. The display panel of claim 7, wherein the input lead wiring having the laminated layer structure is constituted by the electrode wirings of three layers, the electrode wiring of a first layer of the three layers which is the lowermost layer and the gate electrode wiring are formed of the same material at the same step, the electrode wiring of a second layer of the three layers and the pixel electrodes are formed of the same material at the same step, and the electrode wiring of a third layer of the three layers and the source electrode wiring are formed of the same material at the same step.

9. The display panel of claim 7, wherein the input lead wiring having the laminated layer structure is such that an insulating film is interposed between the electrode wiring of the first layer and the electrode wiring layer of the second layer and the insulating protection film is formed on the electrode wiring of the uppermost layer.

10. The display panel of claim 8, wherein the input lead wiring having the laminated layer structure is such that an insulating film is interposed between the electrode wiring of the first layer and the electrode wiring layer of the second layer and the insulating protection film is formed on the electrode wiring of the uppermost layer.

11. A display panel comprising:
an insulating substrate;
gate electrode wirings and source electrode wirings arranged on the insulating substrate like a matrix;
switching elements arranged in individual regions surrounded by the gate electrode wirings and the source electrode wirings, the switching elements being electrically connected to the gate electrode wirings and to the source electrode wirings;
pixel electrodes selectively driven by the switching elements; and
an input lead wiring having a laminated layer structure for connecting the electrode wirings and the pixel electrodes to a drive power source,
wherein the input lead wiring having the laminated layer structure is constituted by the electrode wirings of two or more layers, and the electrode wirings of the second and higher layers forming the input lead wiring of the laminated layer structure are not overlapped on edge portions on both sides of the electrode wiring of the lowermost layer; and
wherein the input lead wiring having the laminated layer structure is constituted by the electrode wirings of three layers, the electrode wiring of a first layer of the three layers which is the lowermost layer and the gate electrode wiring are formed of the same material at the same step, the electrode wiring of a second layer of the three layers and the pixel electrodes are formed of the same material at the same step, and the electrode wiring of a third layer of the three layers and the source electrode wiring are formed of the same material at the same step.

12. The display panel of claim 11, wherein the input lead wiring having the laminated layer structure is such that an insulating film is interposed between the electrode wiring of the first layer and the electrode wiring layer of the second layer and the insulating protection film is formed on the electrode wiring of the uppermost layer.

13. A display panel comprising:
an insulating substrate;
gate electrode wirings and source electrode wirings arranged on the insulating substrate like a matrix;
switching elements arranged in individual regions surrounded by the gate electrode wirings and the source electrode wirings, the switching elements being electrically connected to the gate electrode wirings and to the source electrode wirings;
pixel electrodes selectively driven by the switching elements; and
an input lead wiring having a laminated layer structure for connecting the electrode wirings and the pixel electrodes to a drive power source,
wherein the input lead wiring having the laminated layer structure is constituted by the electrode wirings of two or more layers, and the electrode wirings of the second and higher layers forming the input lead wiring of the laminated layer structure are not overlapped on edge portions on both sides of the electrode wiring of the lowermost layer; and
wherein the input lead wiring having the laminated layer structure is such that an insulating film is interposed between the electrode wiring of the first layer and the electrode wiring layer of the second layer and the insulating protection film is formed on the electrode wiring of the uppermost layer.

14. A display panel including a plurality of pixels, the display panel comprising:

an insulating substrate;

gate electrode wirings and source electrode wirings supported by at least the substrate;

switching elements electrically connected to the gate electrode wirings and to the source electrode wirings;

pixel electrodes selectively driven by the switching elements; and an input lead wiring having a laminated layer structure for connecting the gate and/or source electrode wirings to at least one drive power source, wherein the input lead wiring having the laminated layer structure comprises at least first, second and third electrode wiring layers, the first electrode wiring layer being the lowermost in at least part of the laminated layer structure, wherein the second and third electrode wiring layers at least partially overlap the first electrode wiring layer, and wherein proceeding alone a length of the input lead wiring substantial portions of right and left edges of the second and third electrode wiring layers do not overlap right and left edges of the lowermost first electrode wiring layer.

15. The display panel of claim 14, wherein at least substantial portions of the edges of the second and third electrode wiring layers are common in that they overlap one another at a position (R).

16. A display panel including a plurality of pixels, the display panel comprising:

an insulating substrate;

gate electrode wirings and source electrode wirings supported by at least the substrate;

switching elements electrically connected to the gate electrode wirings and to the source electrode wirings;

pixel electrodes selectively driven by the switching elements; and an input lead wiring having a laminated layer structure for connecting the gate and/or source electrode wirings to at least one drive power source, wherein the input lead wiring having the laminated layer structure comprises at least first, second and third electrode wiring layers, the first electrode wiring layer being the lowermost in at least part of the laminated layer structure, wherein the second and third electrode wiring layers at least partially overlap the first electrode wiring layer, and wherein substantial portions of edges of the second and third electrode wiring layers do not overlap edges of the lowermost first electrode wiring layer on both sides of the lowermost first electrode wiring layer, and wherein edges of the second and third electrode wiring layers are spaced apart from one another and thus do not overlap one another.

17. A display panel including a plurality of pixels, the display panel comprising:

an insulating substrate;

gate electrode wirings and source electrode wirings supported by at least the substrate;

switching elements electrically connected to the gate electrode wirings and to the source electrode wirings;

pixel electrodes selectively driven by the switching elements; and an input lead wiring having a laminated layer structure for connecting the gate and/or source electrode wirings to at least one drive power source, wherein the input lead wiring having the laminated layer structure comprises at least first, second and third electrode wiring layers, the first electrode wiring layer being the lowermost in at least part of the laminated layer structure, wherein the second and third electrode wiring layers at least partially overlap the first electrode wiring layer, and wherein substantial portions of edges of the second and third electrode wiring layers do not overlap edges of the lowermost first electrode wiring layer on both sides of the lowermost first electrode wiring layer, and wherein the second and third electrode wiring layers each comprise a plurality of at least partially parallel wirings having maximum widths of 300 $\mu$m or less.

18. The display panel of claim 17, wherein a space (S) is defined between adjacent parallel wirings of the second and third electrode wiring layers.

19. The display panel of claim 17, wherein the second and third electrode wiring layers each comprise a plurality of at least partially parallel wirings each having a width of 200–300 $\mu$m.

* * * * *